(12) United States Patent
Lin et al.

(10) Patent No.: US 6,817,930 B2
(45) Date of Patent: Nov. 16, 2004

(54) QUICKLY AND SAFELY MAINTAINED SAND-FILTERING DEVICE

(75) Inventors: Yu-Min Lin, Taipei (TW); Tien-Chi Wang, Taipei Hsien (TW)

(73) Assignee: Au Optronics Corp., Hsinchu (TW)

( * ) Notice: Subject to any disclaimer, the term of this patent is extended or adjusted under 35 U.S.C. 154(b) by 234 days.

(21) Appl. No.: 09/973,292

(22) Filed: Oct. 8, 2001

(65) Prior Publication Data

US 2002/0042245 A1 Apr. 11, 2002

(30) Foreign Application Priority Data

Oct. 9, 2000 (TW) ........................................ 89217521 U

(51) Int. Cl.[7] .............................................. B24C 9/00
(52) U.S. Cl. ........................................... 451/88; 451/89
(58) Field of Search ............................... 451/88, 87, 38, 451/39, 89

(56) References Cited

FOREIGN PATENT DOCUMENTS

FR          686200      *  7/1930   .................. 451/87

* cited by examiner

Primary Examiner—Robert A. Rose
(74) Attorney, Agent, or Firm—Ladas & Parry LLP

(57) ABSTRACT

A sand-filtering device for filtering sands produced by a sandblast machine that includes a housing, a supporting plate, at least one filtering sleeve, a division module and an air pump. The housing is connected to the sandblast machine to receive the sands. The supporting plate is detachably mounted in the housing. The filtering sleeve is hung on the supporting plate. The division module is detachably mounted in the housing. The division module has at least one passage connected to the filtering sleeve. The air pump pumps the sands through the passage into the filtering sleeve so that the sands are filtered by the filtering sleeve. To replace the filtering sleeve, the supporting plate and the division module are detached from the housing and directly thrown away together with the filtering sleeve. That is fast, efficient and safe.

14 Claims, 5 Drawing Sheets

QUICKLY AND SAFELY MAINTAINED SAND-FILTERING DEVICE

BACKGROUND OF THE INVENTION

1. Field of the Invention

The present invention relates in general to a quickly and safely maintained sand-filtering device.

2. Description of the Related Art

Referring to FIG. 1, a conventional sand-filtering device 2 for a sandblaster has a housing provided with an air intake 10 and an air outlet 12. The air intake 10 is connected to a sandblast machine 1. In the housing are provided a top plate 21, a bottom plate 22, a plurality of springs 23 and filtering sleeves 24. The top plate 21 and the bottom plate 22 are spaced apart to form a space 14, in which the filtering sleeves 24 are disposed. The filtering sleeves 24 are flexible and contain the springs 23. The spring 23 have hooks at their ends to hang the filtering sleeves 24 on the top plate 21. Further referring to FIG. 2, the bottom plate 22 is provided with a plurality of hollow cylinders 221. The bottom ends of the filtering sleeves 24 are tied to the hollow cylinders 221 via laces.

The sand-filtering device 2 is arranged at the tail of the sandblast machine 1 to receive the used sands during the blasting process. The used sands enter the chamber 20 of the sand-filtering device 2. The air pump 27 pumps air in the sand-filtering device 2 out to carry the used sands upward so that the used sands adhere to the inner walls of the filtering sleeves 24. When the blasting process is finished, the air pump 27 stops. An oscillator 25 starts to horizontally swing the top plate 21 and then swing the springs 23. The springs 23 repeatedly hit the flexible filtering sleeves 24 from side to side so that the sands on the inner walls of the filtering sleeves 24 fall. A collecting bag 3 is provided under the filtering sleeves 24 to collect the sands.

However, repeated hits cannot separate all the sands from the filtering sleeves 24. A part of sands still adhere to the inner walls of the filtering sleeves 24. After months, sands accumulate so that the filtering sleeves 24 fail and need to be replaced with new ones. The top plate 21 and the bottom plate 22 are made of metal and permanently fixed in the sand-filtering device 2. Therefore, the top and bottom plates 21, 22 are not replaced. The life span of the filtering sleeve 24 depends on the amount of the used sand. A large amount of sands results in frequent replacement of filtering sleeves.

The filtering sleeve 24 is replaced in accordance with the following manner: The lace 26 is loosened and taken away from the filtering sleeve 24. Then, the filtering sleeve 24 is lifted to separate the hook of the spring 23 from the top plate 21. Then, the whole filtering sleeve 24 is thrown away. When the lace 26 is detached from the filtering sleeve 24, a large quantity of sands falls out and floats in the air. The fall-out sands are harmful to worker's health and the environment.

SUMMARY OF THE INVENTION

An object of the present invention is to provide a sand-filtering device of quick and safe maintenance for a sandblaster that solves the above-mentioned problems.

The sand-filtering device of the present invention includes a housing, a supporting plate, at least one filtering sleeve, a division module and an air pump. The housing is connected to the sandblast machine to receive the sands. The supporting plate is detachably mounted in the housing. The filtering sleeve is hung on the supporting plate. The division module is detachably mounted in the housing. The division module has at least one passage connected to the filtering sleeve. The air pump pumps the sands through the passage into the filtering sleeve so that the sands are filtered by the filtering sleeve. To replace the filtering sleeve, the supporting plate and the division module are detached from the housing and directly thrown away together with the filtering sleeve. That is fast, efficient and safe.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
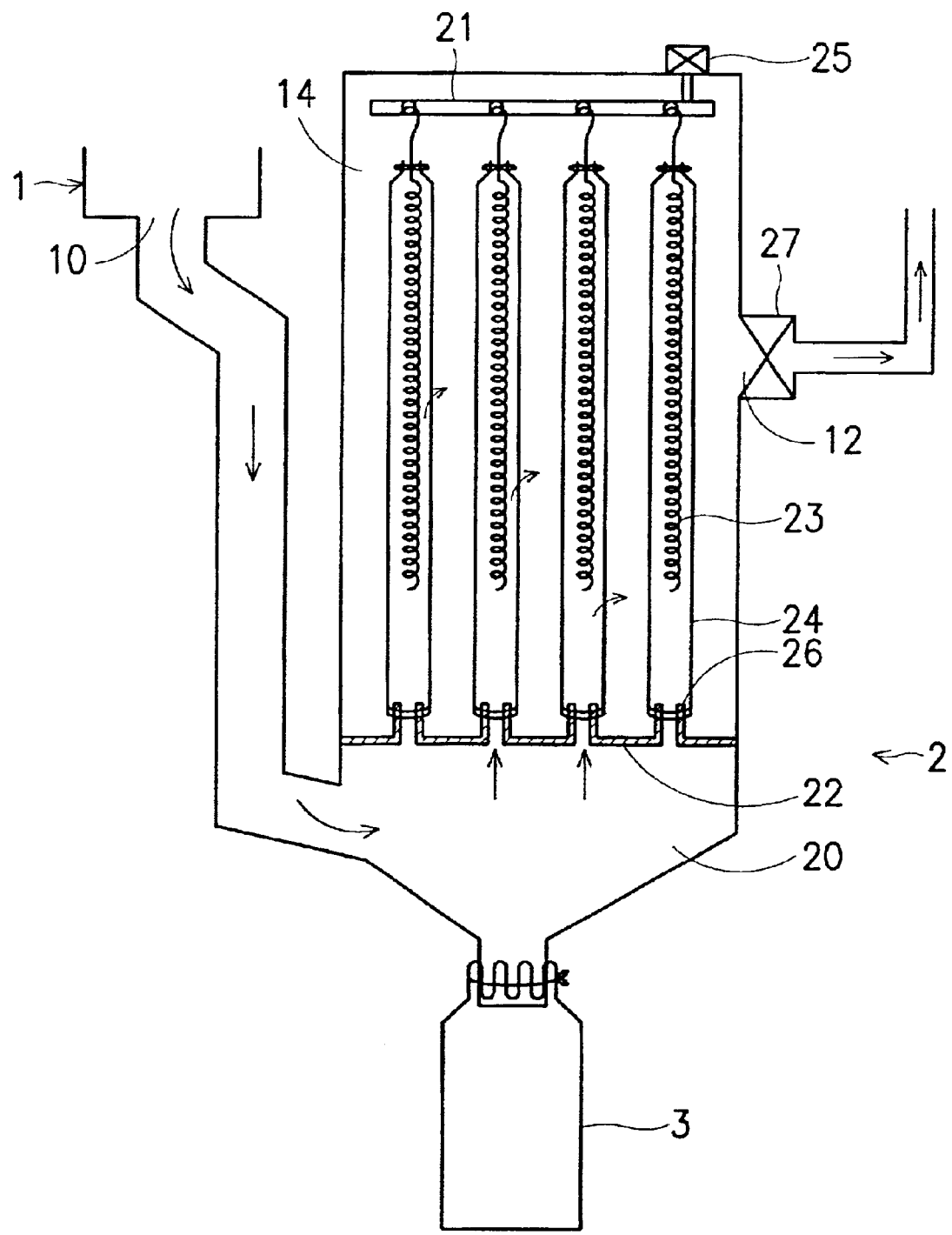
FIG. 1 is a schematic diagram of a conventional sand-filtering device.
Figure 2:
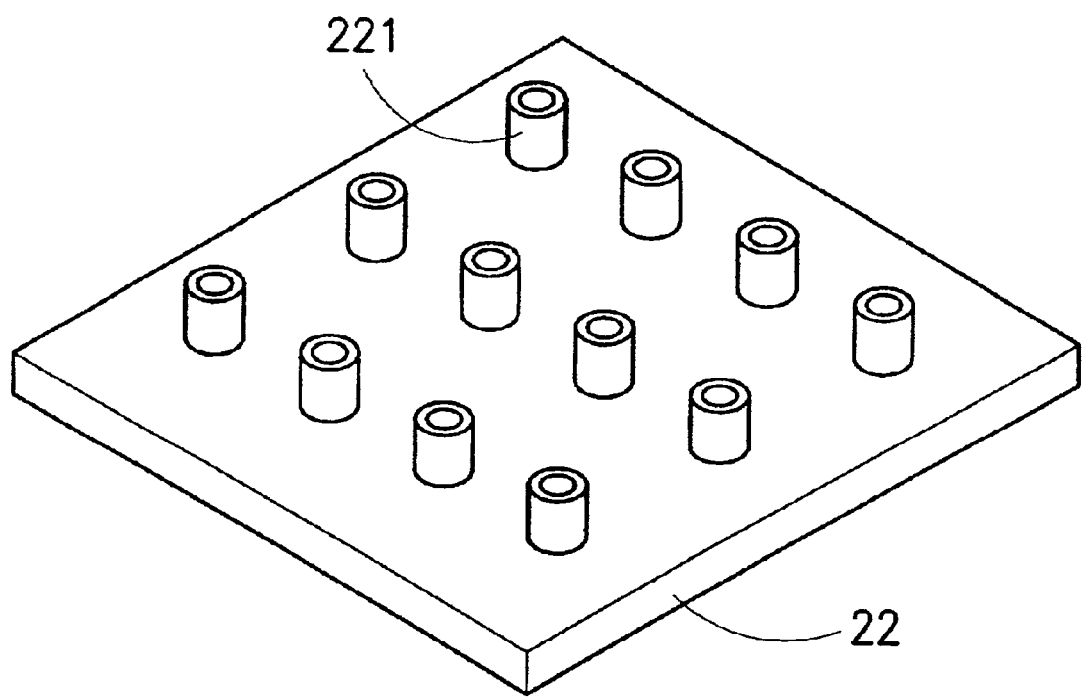
FIG. 2 depicts the bottom plate of the conventional sand-filtering device.
Figure 3:
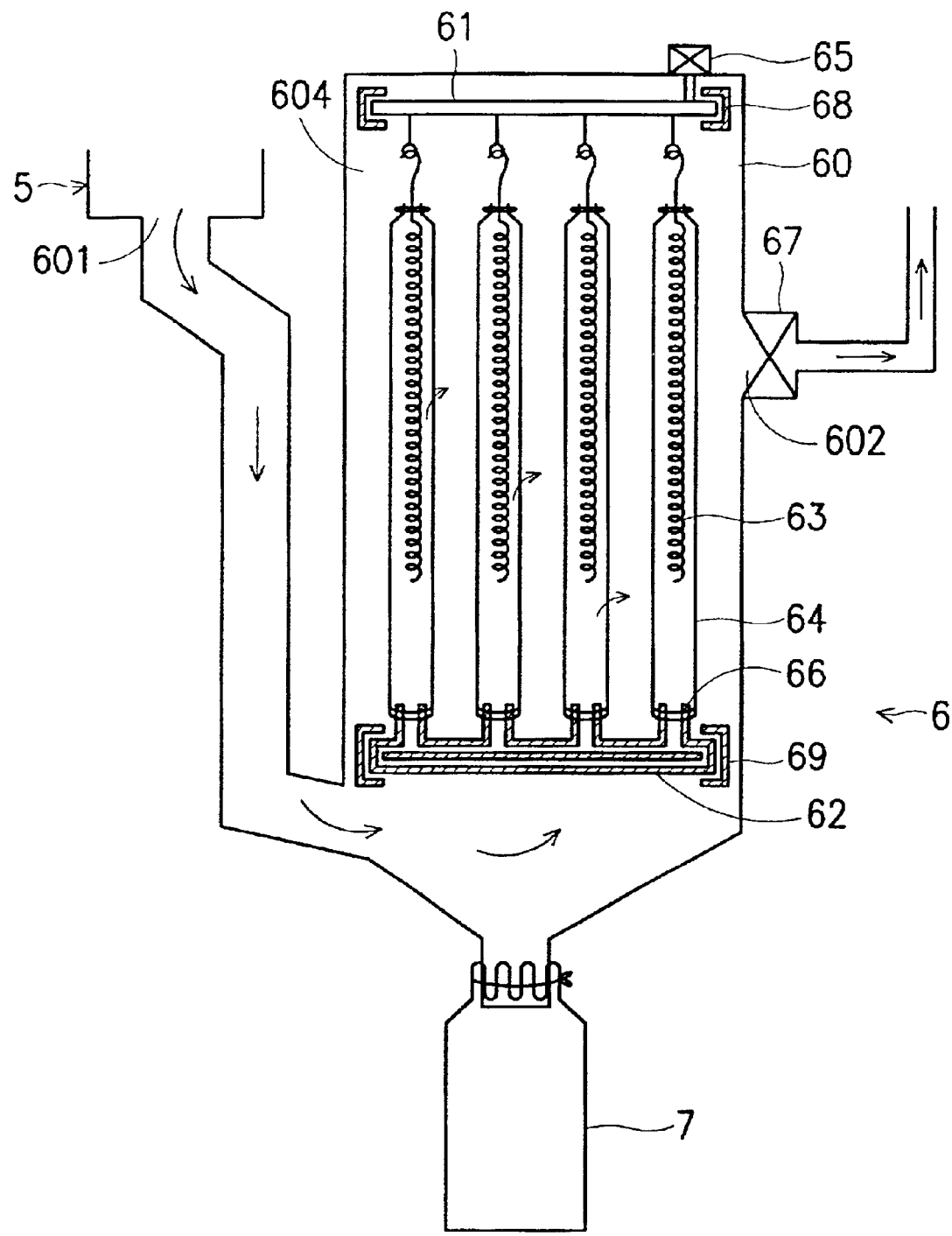
FIG. 3 depicts a sand-filtering device of the present invention.
Figure 4:
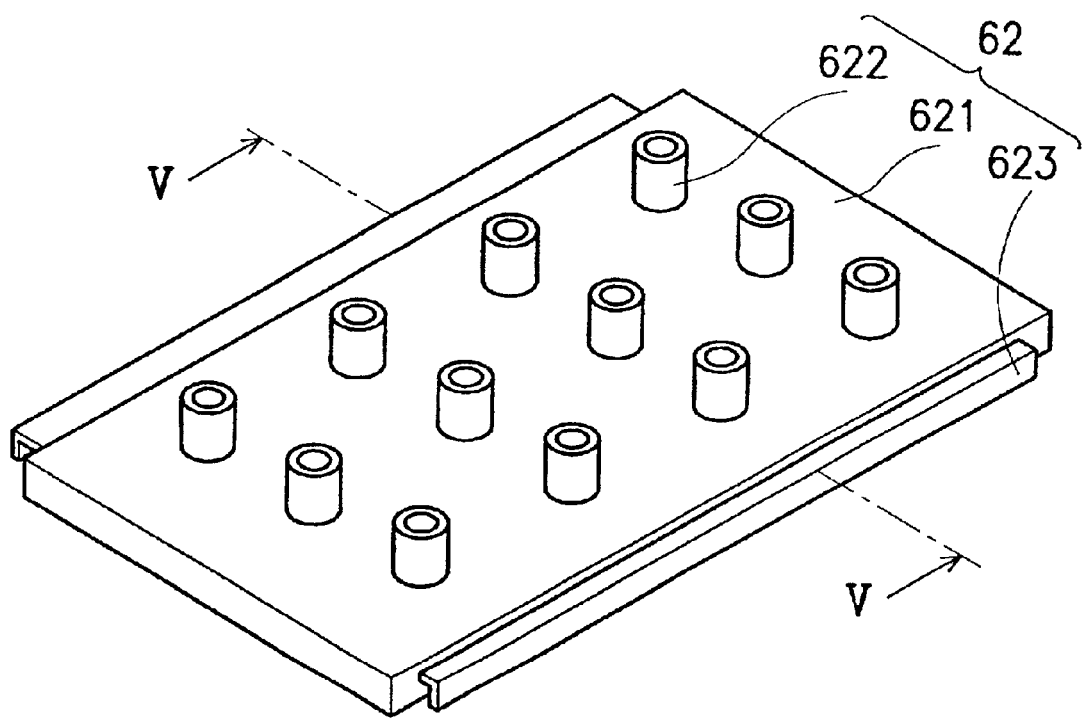
FIG. 4 is a perspective diagram of the division module of the sand-filtering device of the present invention.

Referring to FIG. 3, a sand-filtering device of the present invention has a housing 60 provided with an air intake 601 and an air outlet 602. The air intake 601 is connected to a sandblast machine 5. Two tracks 68, 69 are disposed in the housing 60 to support a supporting plate 61 and a division module 62. The supporting plate 61 and the division module 62 are spaced apart to define a space 604, in which a plurality of filtering sleeves 64 are disposed. The filtering sleeves 64 are flexible and contain springs 63. The springs 63 have hooks at their ends to hang the filtering sleeves 64 on the supporting plate 61. Further referring to FIGS. 4 and 5, the division module 62 has a frame body 621 and a division plate 623. The frame body 621 is rectangular and hollow. On the top of the frame body 621 are provided with a plurality of hollow cylinders 622. On the bottom of the frame body 621 are provided a plurality of through holes 625. The division plate 623 is movably inserted in the frame body 621. A plurality of through holes 624 are provided on the division plate 623 to align with the bores 626 of the cylinders 622 and the through holes 625 of the frame body 621. Referring back to FIG. 3, the ends of the filtering sleeves 64 are tied to the hollow cylinders 622 of the division module 62 via laces 66.

The sand-filtering device 6 is arranged at the tail of the sandblast machine 5 to receive the processed sands during the sand blasting process. The processed sands first enter into the bottom of the sand-filtering device 6, then the air pump 67 pumps air in the sand-filtering device 6 out to carry the processed sands upward so that the processed sands adhere to the inner walls of the filtering sleeves 64. When the blasting process is finished, the air pump 67 stops. An oscillator 65 starts to horizontally swing the supporting plate 61 and then swing the springs 63. The springs 63 repeatedly hit the flexible filtering sleeves 64 from side to side so that the sands on the inner walls of the filtering sleeves 64 fall.

A collecting bag 7 is provided under the filtering sleeves 64 to collect the sands.

Figure 5:
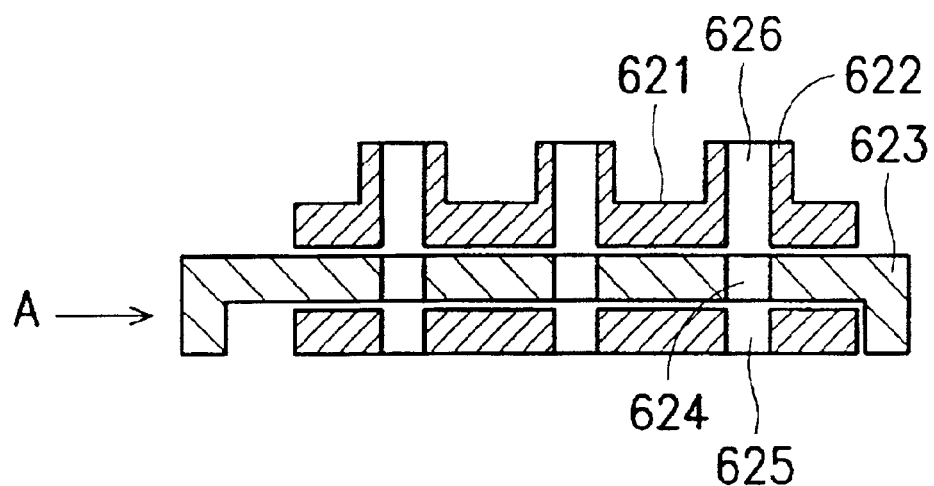
FIG. 5 is a sectional view of the division module of FIG. 4 along line V—V.
Figure 6:
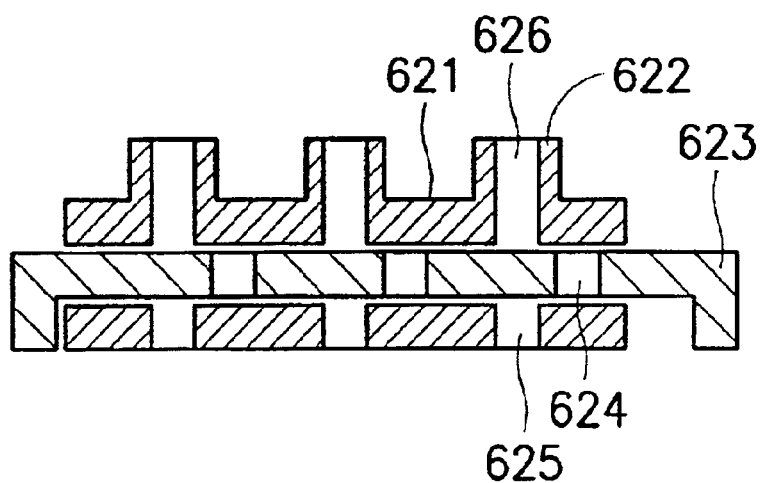
FIG. 6 depicts the division module of the present invention in a close state.

However, hits cannot separate all the sands from the filtering sleeves 64. A part of sands still adhere to the inner walls of the filtering sleeves 64. After several months, sands will accumulate so that the filtering sleeves 64 lose its normal function and need to be replaced with new ones. The filtering sleeve 64 of the present invention is replaced in accordance with the following manner: Referring to FIG. 5, the division plate 623 is pushed in direction A to change the positions of the through holes 624. As a result shown in FIG. 6, the hollow cylinders 622 are closed by the division plate 623. The sands do not leak out from the division module 62. Then, the supporting plate 61 and the division module 62 are drawn from the tracks 68 and 69 respectively, and then the supporting plate 61 and the division module 62 are thrown away together with the filtering sleeves 64.

In the present invention, no laces 66 are released to replace the filtering sleeves 64, instead of directly throwing away the filtering sleeves 64, the supporting plate 61 and the division module 62 and replaced them with new ones. The Maintenance for the sand-filtering device of the present invention is fast and efficient. Furthermore, the laces 66 are not detached. Therefore, the sands adhering to the filtering sleeves do not fall out. The worker's health and the environment are protected.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sand-filtering device for filtering sands produced by a sandblast machine, including:
    a housing connected to the sandblast machine to receive the sands;
    a supporting plate detachably mounted in the housing;
    at least one filtering sleeve hung on the supporting plate; and
    a division module detachably mounted in the housing, the division module having at least one passage connected to the filtering sleeve, wherein the division module further has a frame body and a division plate, the frame body is hollow, the division plate is movably inserted in the frame body, the division plate defines a first through hole, the frame body defines a second through hole, the first through hole communicates with the second through hole when the division plate is moved to a first position, and the second through hole is closed by the division plate when the division plate is moved to a second position.

2. A sand-filtering device as claimed in claim 1, wherein the frame body is rectangular and has a first surface and a second surface opposite to the first surface, and the second surface defines the second through hole.

3. A sand-filtering device as claimed in claim 2, wherein the frame body further has a hollow cylinder provided on the first surface, the hollow cylinder has a bore, and the bore communicates with the first through hole and the second through hole when the division plate is moved to the first position.

4. A sand-filtering device for filtering sands produced by a sandblast machine, comprising:
    a housing connected to the sandblast machine to receive the sands;
    a supporting plate detachably mounted in the housing;
    at least one filtering sleeve hung on the supporting plate;
    a division module detachably mounted in the housing, the division module having at least one passage connected to the filtering sleeve; and
    two tracks mounted in the housing to respectively support the supporting plate and the division module so that the supporting plate and the division module are detachable from the tracks.

5. A sand-filtering device for filtering sands produced by a sandblast machine, comprising:
    a housing connected to the sandblast machine to receive the sands;
    a supporting plate detachably mounted in the housing;
    at least one filtering sleeve hung on the supporting plate; and
    a division module detachably mounted in the housing, the division module having at least one passage connected to the filtering sleeve,
    wherein the housing has an air intake and an air outlet, the air intake is connected to the sandblast machine, between the supporting plate and the division module define a space, the filtering sleeve is disposed in the space, the filtering sleeve has a first end and a second end, the first end of the filtering sleeve is fixed to the supporting plate, the second end of the filtering sleeve is open and connected to the passage, the air pump is mounted at the air outlet to pump the sands into the filtering sleeve, whereby the filtering sleeve follows the supporting plate and the division module to be removed out from the housing.

6. A sand-filtering device for filtering sands produced by a sandblast machine, comprising:
    a housing connected to the sandblast machine to receive the sands; and
    a removable filtering module, including a supporting plate and a division module detachable mounted to the housing, and at least a filtering sleeve connected between the supporting plate and the division module having at least one occludable passage connected to the filtering sleeve.

7. A sand-filtering device as claimed in claim 6, wherein the division module further has a frame body and a division plate, the frame body is hollow, the division plate is movably inserted in the frame body, the division plate defines a first through hole, the frame body defines a second through hole, the first hole communicates with the second through hole when the division plate moves to a first position, and the second through hole is closed by the division plate when the division plate moves to a second position.

8. A sand-filtering device as claimed in claim 7, wherein the frame body is rectangular and has a first surface and a second surface opposite to the first surface, and the second surface defines the second through hole.

9. A sand-filtering device as claimed in claim 8, wherein the frame body further has a hollow cylinder disposed on the first surface, the hollow cylinder has a bore, and the bore communicates with the first through hole and the second through hole when the division plate moves to the first position.

10. A sand-filtering device as claimed in claim 6, further comprising two tracks mounted in the housing to respectively support the supporting plate and the division module so that the supporting plate and the division module are detachable from the tracks.

11. A sand-filtering device for filtering sands produced by a sandblast machine, comprising:

a housing connected to the sandblast machine to receive the sands; and a supporting plate placed and a division module detachably mounted to the housing, and at least a filtering sleeve connected between the supporting plate and the division module, the division module having at least one passage connected to the filtering sleeve, wherein the division module further has a frame body and division plate, the frame body is hollow, the division plate is movably inserted in the frame body, the division plate defines a first through hole, the frame body defines a second through hole, the first through hole communicates with the second through hole when the division plate moves to a first position, and the second through hole is closed by the division plate when the division plate moves to a second position.

12. A sand-filtering device as claimed in claim 11, wherein the frame body is rectangular and has a first surface and a second surface opposite to the first surface, and the second surface defines the second through hole.

13. A sand-filtering device as claimed in claim 12, wherein the frame body further has a hollow cylinder disposed on the first surface, the hollow cylinder has a bore, and the bore communicates with the first through hole and the second through hole when the division plate moves to the first position.

14. A sand-filtering device for filtering sands produced by a sandblast machine, comprising:

a housing connected to the sandblast machine to receive the sands;

a supporting plate placed and a division module detachably mounted to the housing, and at least a filtering sleeve connected between the supporting plate and the division module, the division module having at least one passage connected to the filtering sleeve; and two tracks mounted in the housing to respectively support the supporting plate and the division module so that the supporting plate and the division module are detachable from the tracks.

* * * * *